United States Patent
Wong et al.

(10) Patent No.: US 10,225,765 B2
(45) Date of Patent: Mar. 5, 2019

(54) NETWORK SHARING AND REVERSE SINGLE RADIO VOICE CALL CONTINUITY

(71) Applicant: NOKIA SIEMENS NETWORKS OY, Espoo (FI)

(72) Inventors: Curt Wong, Sammamish, WA (US); Lauri Kalevi Lahtinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/049,626

(22) Filed: Oct. 9, 2013

(65) Prior Publication Data
US 2014/0038611 A1    Feb. 6, 2014

Related U.S. Application Data (63) Continuation of application No. 13/860,730, filed on Apr. 11, 2013, now Pat. No. 10,080,162.

(30) Foreign Application Priority Data

Apr. 11, 2012    (WO) ............... PCT/US2012/033003

(51) Int. Cl.
*H04W 36/00*    (2009.01)
(52) U.S. Cl.
CPC ... *H04W 36/0022* (2013.01); *H04W 36/0005* (2013.01)
(58) Field of Classification Search
CPC ...... H04W 80/04; H04W 36/18; H04W 36/14
See application file for complete search history.

(56) References Cited

U.S. PATENT DOCUMENTS

| | | |
|---|---|---|
| 6,782,274 B1 | 8/2004 | Park et al. |
| 7,697,935 B2 | 4/2010 | Guyot et al. |

(Continued)

FOREIGN PATENT DOCUMENTS

| | | |
|---|---|---|
| EP | 2 521 401 A1 | 11/2012 |
| JP | 2014-529960 A | 11/2014 |

(Continued)

OTHER PUBLICATIONS

S2-121507; Nokia Siemens Networks; "Network Sharing scenario in rSRVCC"; SA WG2 Meeting #90; Apr. 16-20, 2012; Bratislava, Slovakia.

(Continued)

*Primary Examiner* — Zhiren Qin
(74) *Attorney, Agent, or Firm* — Squire Patton Boggs (US) LLP (57) ABSTRACT

Certain networks can operate using circuit switched infrastructure, while other networks may operate using infrastructure for the long term evolution (LTE) of the third generation partnership project (3GPP). Devices can operate across the boundaries of these networks. Thus, such devices as well as the networks may benefit from network sharing in reverse single radio voice call continuity. For example, a method may include requesting handover of a user equipment from a source network to a target network. The method may also include providing a network identification corresponding to the source network while requesting the handover. Alternatively, or in addition, a method may include requesting handover of a user equipment from a source network to a target network. The method may also include determining the target network based on a network identification received previously.

9 Claims, 7 Drawing Sheets

(56) References Cited

U.S. PATENT DOCUMENTS

| | | | |
|---|---|---|---|
| 2006/0073831 A1* | 4/2006 | Guyot et al. | 455/443 |
| 2006/0281459 A1 | 12/2006 | Marinescu et al. | |
| 2010/0040020 A1 | 2/2010 | Chen | |
| 2010/0093345 A1 | 4/2010 | Verhoef et al. | |
| 2010/0261473 A1* | 10/2010 | Al-Bakri | H04W 8/02 |
| | | | 455/435.2 |
| 2010/0284366 A1* | 11/2010 | Zhu | 370/331 |
| 2011/0051691 A1 | 3/2011 | Hietalahti et al. | |
| 2011/0151796 A1* | 6/2011 | Walby | B60R 25/2072 |
| | | | 455/67.7 |
| 2011/0188468 A1* | 8/2011 | Vikberg | H04W 36/0066 |
| | | | 370/331 |
| 2012/0210397 A1 | 8/2012 | Suh et al. | |
| 2012/0295620 A1* | 11/2012 | Stephens | H04L 65/103 |
| | | | 455/436 |

FOREIGN PATENT DOCUMENTS

| | | |
|---|---|---|
| KR | 10-2008-0019169 A | 3/2008 |
| KR | 10-2010-0126834 A | 12/2010 |
| WO | 2010/092449 A1 | 8/2010 |
| WO | 2011/079802 A1 | 7/2011 |
| WO | 2014/029065 A | 2/2014 |

OTHER PUBLICATIONS

European Search Report application No. 13162519.6 dated Feb. 12, 2015.

Japanese Office Action and its English language translation issued in corresponding JP Application No. 2015-505690, dated Aug. 3, 2016.

Korean Office Action Action issued in corresponding KR Application No. 10-2014-7031412, dated Sep. 8, 2016.

3GPP TSG CT4 Meeting #53, V9.6.0 "Source SAI during SRVCC HO from UTRAN to GERAN", Change Request; C4-111586, Revision 2, pp. 1-6, May 9-13, 2011.

U.S. Office Action issued in related U.S. Appl. No. 13/860,730, dated Sep. 16, 2016.

Office Action dated Feb. 11, 2016, issued in corresponding KR application No. 10-2014-7031412 (English translation only).

Office Action dated Aug. 31, 2015, issued in corresponding JP application No. 2015-505690 (English translation only).

Office Action dated May 12, 2016, issued in related U.S. Appl. No. 13/860,730.

European Office Action issued in European Patent Application No. 13 162 519.6 dated May 16, 2018.

"3rd Generation Partnership Project; Technical Specification Group Core Network and Terminals; Evolved Packet System (EPS); 3GPP SV interface (MME to MSC, and SGSN to MSC) for SRVCC (Release 8)", 3GPP Standard; Technical Specification; 3GPP TS 29.280, vol. CT WG4, No. V8.8.0, Dec. 17, 2011 (Dec. 17, 2011), pp. 1-14, XP051297172, [retrieved on Dec. 17, 2011].

Japanese Office Action issued in corresponding Japanese Patent Application No. 2015-505690 dated Jun. 5, 2017.

Japanese Office Action and its English Language Translation dated Jan. 29, 2018, issued in corresponding JP Application No. 2017-018570.

3GPP TSG RAN WG3 Meeting #75bis, Ericsson, "rSRVCC: the timing perspective of some key information elements", San Jose del Cabo, Mexico, Mar. 26-30, 2012, R3-120731.

3GPP TS 29.280 V11.1.0 (Dec. 2011), 3rd Generation Partnership Project; Technical Specification Group Core Network and Terminals; Evolved Packet System (EPS); 3GPP SV interface (MME to MSC, and SGSN to MSC) for SRVCC; (Release 11), 17 pages.

Chinese Office Action dated Feb. 24, 2018, issued in corresponding CN Application No. 201280072294.8.

Korean Office Action dated Jul. 4, 2016, issued in corresponding Korean Application No. 10-2016-7011557.

3GPP TS 23.251 V10.3.0 (Mar. 2012), Technical Specification, 3rd Generation Partnership Project; Technical Specification Group Services and System Aspects; Network Sharing; Architecture and functional description (Release 10). Mar. 2012, pp. 1-27.

Korean Office Action dated Feb. 23, 2017, issued in corresponding KR Application No. 10-2016-7011574.

Korean Office Action dated Feb. 23, 2017, issued in corresponding KR Application No. 10-2016-7011557.

International Search Report and Written Opinion dated Jul. 20, 2012 corresponding to International Patent Application No. PCT/US2012/033003.

3GPP TS 23.251, V8.3.0 (Mar. 2011), Technical Specification, 3rd Generation Partnership Project; Technical Specification Group Services and System Aspects; Network Sharing; Architecture and functional description (Release 8), Mar. 2011, pp. 1-20.

3GPP TS 23.251, V11.1.0 (Mar. 2012), Technical Specification, 3rd Generation Partnership Project; Technical Specification Group Services and System Aspects; Network Sharing; Architecture and functional description (Release 11), Mar. 2012, pp. 1-28.

* cited by examiner

NETWORK SHARING AND REVERSE SINGLE RADIO VOICE CALL CONTINUITY

CROSS REFERENCE TO RELATED APPLICATION

This is a Continuation of application Ser. No. 13/860,730 filed Apr. 11, 2013 which claims priority from International Patent Application No. PCT/US2012/033003 filed on Apr. 11, 2012. The disclosures of the prior applications are hereby incorporated by reference herein in their entirety.

BACKGROUND

Field

Certain networks can operate using circuit switched infrastructure, while other networks may operate using infrastructure for the long term evolution (LTE) of the third generation partnership project (3GPP). Devices can operate across the boundaries of these networks. Thus, such devices as well as the networks may benefit from network sharing in reverse single radio voice call continuity.

Certain networks can also operate using circuit switched infrastructure itself with multiple operators. Devices can operate across the boundaries of multiple operators' covered areas within these networks. Thus, such devices as well as the networks may benefit from network sharing while maintaining voice call continuity between or among operators' covered areas.

Description of the Related Art

In Release 8 (Rel 8), 3GPP specified single radio voice call continuity (SRVCC) from LTE to second or third generation (2/3G) circuit switched (CS). SRVCC can refer to the procedures for continuity and alternatively can also be used to describe the action of using such procedures. In Rel 11, 3GPP specified SRVCC in the 2/3G CS to LTE packet switched (PS) direction, namely reverse SRVCC (rSRVCC). Network sharing with behavior for handover target selection from LTE to 2/3G CS is described in 3GPP technical specification (TS) 23.251, which is incorporated herein by reference in its entirety. However, network sharing behavior for handover from CS domain to LTE has not been defined in 3GPP.

Network sharing behavior for handover from CS domain to another CS domain is described in 3GPP TS 23.251.

SUMMARY

According to a first embodiment, a method may comprise requesting handover of a user equipment from a source network to a target network. The method may also comprise providing a network identification corresponding to the source network while requesting the handover.

In the first embodiments, the source network may be a packet-switched network and the target network may be a circuit switched network.

The network identification, in the first embodiments, may be an identification of a current public land mobile network in use (for example an identification of a public land mobile network used when the call or session is first established or used after a packet switched to packet switched handover) or a source public land mobile network identifier.

According to the first embodiment, the handover request may be a packet switched to circuit switched handover request comprising the network identification.

The handover request, according to the first embodiment, may be a single radio voice call continuity request from a packet switched network to a circuit switched network.

In the first embodiment, the requesting the handover may be performed by a mobility management entity or serving general packet radio service support node and the identification may be provided to a mobile switching center.

The source network, in a variation of the first embodiment, may be a circuit switched network and the target network may be a circuit switched network.

The network identification, according to the variation of the first embodiment, may comprise an identification of a circuit switched public land mobile network used (for example an identification of a public land mobile network used when the call is first established or used after a packet switched to packet switched hand over) or a source circuit switched public land mobile network identifier.

The handover request may be a circuit switched handover request comprising the network identification in the variation of the first embodiment.

The handover request may be a circuit switched handover request from one circuit switched radio access technology to another circuit switched radio access technology or from one circuit switched network to another circuit switched network, according to the variation of the first embodiment.

According to the variation of the first embodiment, handover may be requested by the source network and identification may be provided to the target network.

In a second embodiment, the method may comprise requesting handover of a user equipment from a source network to a target network. The method may also comprise determining the target network based on a network identification received previously.

The source network, in the second embodiment, may be a circuit switched network and the target network may be a packet switched network.

According to the second embodiment, the network identification may comprise a source public land mobile network identification from the packet switched network (for example received from the packet switched network), or a target public land mobile network identifier.

The handover request may be, in the second embodiment, a circuit switched to packet switched handover request comprising the network identification.

In the second embodiment, the handover may be a reverse single radio voice call continuity handover.

According to the second embodiment, the handover request may be transmitted from a base station controller or radio network controller to a mobile switching center.

The network identification, in the second embodiment, might have been received with an earlier packet switched to circuit switched handover request and might be a network identification of an earlier used source packet switched public land mobile network.

A method, according to a third embodiment, may comprise requesting handover of a user equipment from a source network to a target network. The method may also comprise forwarding a network identification received previously at the source network to the target network.

In the third embodiment, the source network may be a circuit switched network and the target network may be a circuit switched network.

According to the third embodiment, the handover request may be an inter-radio access technologies handover request or an intra-radio access technology handover request.

The handover request may comprise the network identifier in a third embodiment.

The handover request, according to the third embodiment, may be transmitted from a source base station controller or source radio network controller to a target base station controller or a target radio network controller.

The network identification, in the third embodiment, may be a source public land mobile network identification from a packet switched network, which might have been received with an earlier packet switched to circuit switched handover request and might be a network identification of the earlier source packet switched network or a network identifier of the earlier source packet switched network.

According to the third embodiment, the network identification may be a source public land mobile network identification from a circuit switched network, which might have been received with an earlier circuit switched to circuit switched handover request and might be a network identification of the earlier source circuit switched network or a network identifier of the earlier source circuit switched network.

A method, in a fourth embodiment, may comprise receiving a request for handover of a user equipment from a source network to a target network. The method may also comprise forwarding a network identification corresponding to the source network to the target network.

In the fourth embodiment, the source network may be a packet switched network and the target network may be a circuit switched network.

According to the fourth embodiment, the network identification may comprise a current packet switched public land mobile network in use information or a source packet switched public land mobile network identifier.

The handover request, in the fourth embodiment, may be a packet switched to circuit switched handover request comprising the network identification.

The handover request may be a reverse single radio voice call continuity handover request, according to the fourth embodiment.

The handover request, in the fourth embodiment, may be received from a mobility management entity or serving general packet radio service support node and may be forwarded to a base station controller or radio network controller.

A non-transitory computer-readable medium is, in a fifth embodiment, encoded with instructions that, when executed in hardware, perform a process. The process may comprise requesting handover of a user equipment from a source network to a target network. The process also may comprise providing a network identification corresponding to the source network while requesting the handover. The process may also encompass all the variations of the method of the first embodiment, described above.

A non-transitory computer-readable medium is, according to a sixth embodiment, encoded with instructions that, when executed in hardware, perform a process. The process may comprise requesting handover of a user equipment from a source network to a target network. The process may also comprise determining the target network based on a network identification received previously. The process may also encompass all the variations of the method of the second embodiment, described above.

In a seventh embodiment, a non-transitory computer-readable medium is encoded with instructions that, when executed in hardware, perform a process. The process may comprise requesting handover of a user equipment from a source network to a target network. The process may also comprise forwarding a network identification received previously at the source network to the target network. The process may also encompass all the variations of the method of the third embodiment, described above.

According to eighth embodiment, a non-transitory computer-readable medium is encoded with instructions that, when executed in hardware, perform a process. The process may comprise receiving a request for handover of a user equipment from a source network to a target network. The process may also comprise forwarding a network identification corresponding to the source network to the target network. The process may also encompass all the variations of the method of the fourth embodiment, described above.

In a ninth embodiment, an apparatus may comprise at least one processor and at least one memory comprising computer program code. The at least one memory and the computer program code may be configured to, with the at least one processor, cause the apparatus at least to request handover of a user equipment from a source network to a target network. The at least one memory and the computer program code may be also configured to, with the at least one processor, cause the apparatus at least to provide a network identification corresponding to the source network while requesting the handover. The apparatus may be configured to perform all the variations of the method of the first embodiment, described above.

The apparatus, in the ninth embodiment, may be a mobility management entity or a mobile switching center.

According to a tenth embodiment, an apparatus may comprise at least one processor and at least one memory comprising computer program code. The at least one memory and the computer program code may be configured to, with the at least one processor, cause the apparatus at least to request handover of a user equipment from a source network to a target network. The at least one memory and the computer program code may be also configured to, with the at least one processor, cause the apparatus at least to determine the target network based on a network identification received previously. The apparatus may be configured to perform all the variations of the method of the second embodiment, described above.

In the tenth embodiments, the apparatus may be a base station controller or a radio network controller.

An apparatus, in an eleventh embodiment, may comprise at least one processor and at least one memory comprising computer program code. The at least one memory and the computer program code may be configured to, with the at least one processor, cause the apparatus at least to request handover of a user equipment from a source network to a target network. The at least one memory and the computer program code may be also configured to, with the at least one processor, cause the apparatus at least to forward a network identification received previously at the source network to the target network. The apparatus may be configured to perform all the variations of the method of the third embodiment, described above.

According to eleventh embodiment, the apparatus may be a base station controller, a radio network controller, or a mobile switching center.

An apparatus, according to a twelfth embodiment, may comprise at least one processor and at least one memory comprising computer program code. The at least one memory and the computer program code may be configured to, with the at least one processor, cause the apparatus at least to receive a request for handover of a user equipment from a source network to a target network. The at least one memory and the computer program code may be also configured to, with the at least one processor, cause the apparatus at least to forward a network identification corresponding to the source network to the target network. The apparatus may be configured to perform all the variations of the method of the fourth embodiment, described above.

The apparatus may comprise a mobile switching center, according to certain embodiments.

In a thirteenth embodiment, an apparatus may comprise requesting means for requesting handover of a user equipment from a source network to a target network. The apparatus may also comprise providing means for providing a network identification corresponding to the source network while requesting the handover. The apparatus may also comprise means for performing all the variations of the method of the first embodiment, described above.

According to fourteenth embodiment, an apparatus may comprise requesting means for requesting handover of a user equipment from a source network to a target network. The apparatus may also comprise determining means for determining the target network based on a network identification received previously. The apparatus may also comprise means for performing all the variations of the method of the second embodiment, described above.

An apparatus, in fifteenth embodiment, may comprise requesting means for requesting handover of a user equipment from a source network to a target network. The apparatus may also comprise forwarding means for forwarding a network identification received previously at the source network to the target network. The apparatus may also comprise means for performing all the variations of the method of the third embodiment, described above.

An apparatus, according to a sixteenth embodiment, may comprise receiving means for receiving a request for handover of a user equipment from a source network to a target network. The apparatus may also comprise forwarding means for forwarding a network identification corresponding to the source network to the target network. The apparatus may also comprise means for performing all the variations of the method of the fourth embodiment, described above.

A system, in a seventeenth embodiment, may comprise a first apparatus comprising at least one processor and at least one memory comprising computer program code, wherein at the at least one memory and the computer program code are configured to, with the at least one processor, cause the first apparatus at least to request first handover of a user equipment from a first source network to a first target network and provide a network identification corresponding to the first source network while requesting the handover. The system may also comprise a second apparatus comprising at least one processor and at least one memory comprising computer program code, wherein at the at least one memory and the computer program code are configured to, with the at least one processor, cause the second apparatus at least to request handover of the user equipment from a second source network to a second target network and forward the network identification received previously from the first apparatus at the source network to the target network, wherein the second source network corresponds to the first target network. The system may further comprise a third apparatus comprising at least one processor and at least one memory comprising computer program code, wherein at the at least one memory and the computer program code are configured to, with the at least one processor, cause the third apparatus at least to receive the request from the second apparatus for handover of the user equipment from the second source network to the second target network and forward the network identification corresponding to the source network to the target network. The system may additionally comprise a fourth apparatus comprising at least one processor and at least one memory comprising computer program code, wherein at the at least one memory and the computer program code are configured to, with the at least one processor, cause the fourth apparatus at least to request handover of the user equipment from a third source network to a third target network and determine the third target network based on the network identification received previously, wherein the third source network corresponds the second target network.

The first, second, third, and fourth apparatuses in the system of the thirteenth embodiment may be configured to perform all the variations of the methods of the first, second, third, and fourth embodiments, described above.

BRIEF DESCRIPTION OF THE DRAWINGS

For proper understanding of the invention, reference should be made to the accompanying drawings, wherein.

DETAILED DESCRIPTION

Figure 1:
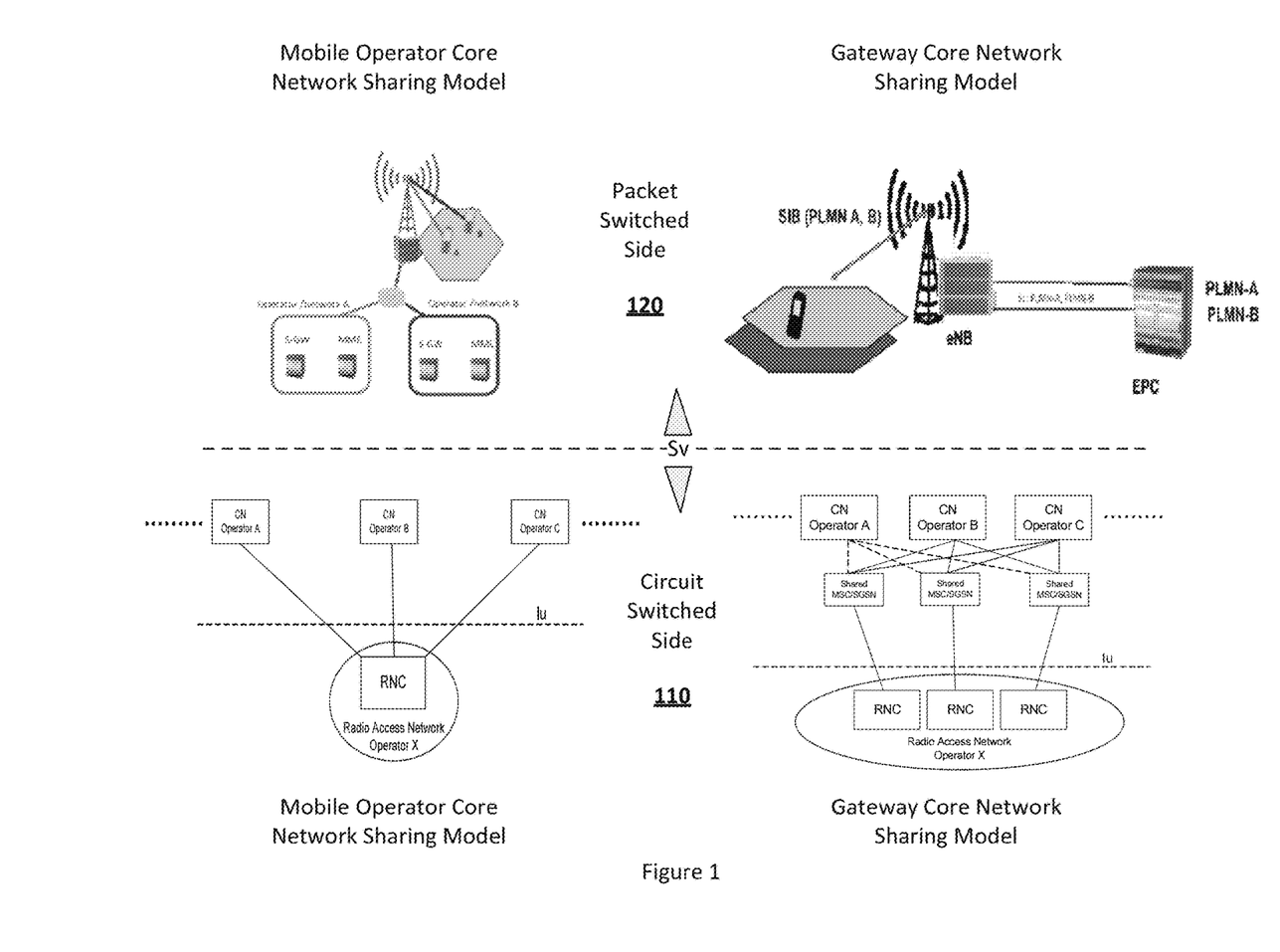
FIG. 1 illustrates possible network-sharing scenarios.

FIG. 1 illustrates possible network-sharing scenarios. In the sharing scenarios, the circuit switched (CS) domain 110 may be configured with Mobile Operator Core Network (MOCN) sharing models (lower left side of FIG. 1) and Gateway Core Network (GWCN) sharing model (lower right side of FIG. 1). On the long term evolution (LTE) side 120, the network may be configured similarly: upper left of FIG. 1 shows MOCN, upper right of FIG. 1 shows GWCN models. The connection between the LTE and CS domain may be the Sv interface, which is defined in 3GPP.

FIG. 1 more particularly illustrates several CN Operators respectively CN Operator A 111a, CN Operator B 111b, and CN Operator C 111c. The figure also illustrates shared MSC/SGSNs 112a, 112b, and 112c. The figure further illustrates a radio access network (RAN) belonging to operator X 113. In the RAN one may find one or more radio network controllers (RNCs) 114. All these may be found on the CS domain side 110.

On the packet switched domain side 120, there is illustrated an evolved packet core element 121, connected to a eNode B (eNB) 122, which is serving a cell 123 and a user equipment 124. The operator networks 125 can specifically comprise such elements as S-GW 126 and MME 127.

As mentioned above, network sharing behavior from CS domain to LTE has not been defined in 3GPP. In particular, the scenario illustrated in FIG. 2 is not conventionally addressed.

Figure 2:
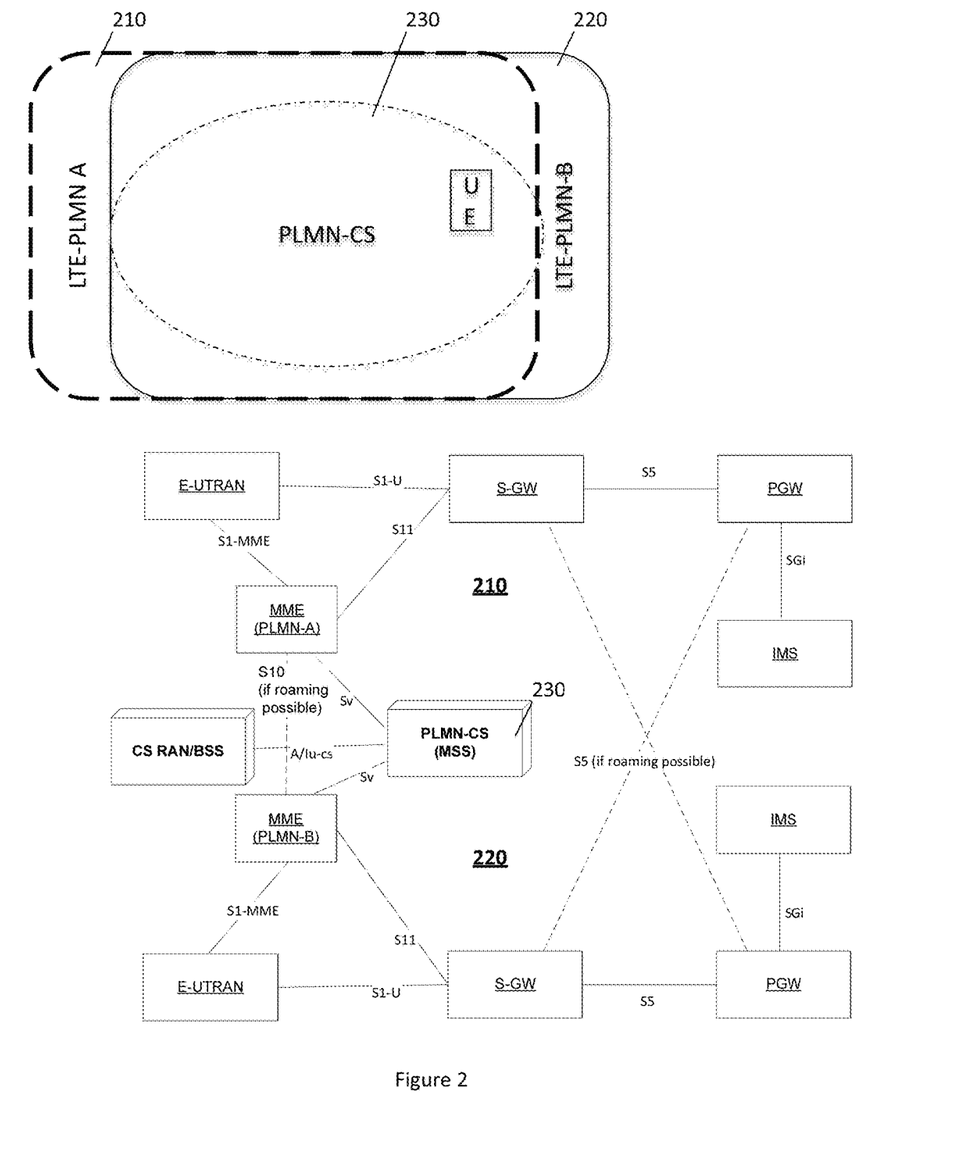
FIG. 2 illustrates the sharing of a circuit switched public land mobile network by two long term evolution mobile networks, according to certain embodiments.

FIG. 2 illustrates the sharing of a circuit switched public land mobile network by two long term evolution mobile networks, according to certain embodiments. More particularly, FIG. 2 shows that the serving area may comprise two LTE PLMNs, LTE-PLMN A 210 and LTE-PLMN B 220, and they both may use the same CS PLMN-CS 230 for single radio voice call continuity (SRVCC). This may be viewed as two green field LTE operators relaying on 3rd party CS Domain for SRVCC. A Venn diagram illustrates the sharing at top, while a network connection view is shown at the bottom of FIG. 2.

The two LTE networks 210 and 220 can comprise respect MMEs 211 and 221, respective E-UTRANs 212 and 222, respective S-GWs 213 and 223, respective PGWs 214 and 224, and respective IMSs 215 and 225. Also illustrated is the CS RAN/BSS 235 connected to the PLMN-CS (MSS) 230.

In one case, a user equipment (UE) may start an internet protocol (IP) multimedia subsystem (IMS) voice session with PLMN-A and SRVCC over to PLMN-CS. The source evolved universal terrestrial radio access network (E-UTRAN) may select the "target CS PLMN" and may send this selected "target CS PLMN" in a message to the PLMN-CS's MSS via Sv for target resource handling. When this call is returned, going back from CS to LTE with rSRVCC, the CS radio node, such as for example a BTS or NodeB, can select the target LTE PLMN based on a current PLMN in use. This may still be the selected "CS PLMN". This "CS PLMN" may perform rSRVCC to either LTE-PLMN-A or LTE-PLMN-B.

If a wrong LTE-PLMN is selected, the result may be a rSRVCC failure if, for example, the radio node decided to use LTE-PLMN-B but LTE-PLMN-B and LTE-PLMN-A do not have roaming agreement. This may be because the serving gateway (S-GW) in the PLMN-B cannot establish an S5 connection with the proxy gateway (P-GW) in PLMN-A or the MME in the PLMN-B cannot establish an S10 connection with the MME in PLMN-A. The S5 and S10 connections are shown with dotted lines in FIG. 2. In other words, in this example for rSRVCC to work, the P-GW established prior to rSRVCC must be the anchor point also after rSRVCC, and the new MME (B) must be able to retrieve the user equipment (UE) Packet Switch user information from old MME (A).

Moreover, even if the rSRVCC may be successful because LTE-PLMN-A and LTE-PLMN-B have a roaming agreement, the result may be a roaming S5 unnecessarily being established, when the call could have been handled in LTE-PLMN-A directly. This may also lead to unnecessary roaming charges because an additional PLMN is involved.

Figure 3A:
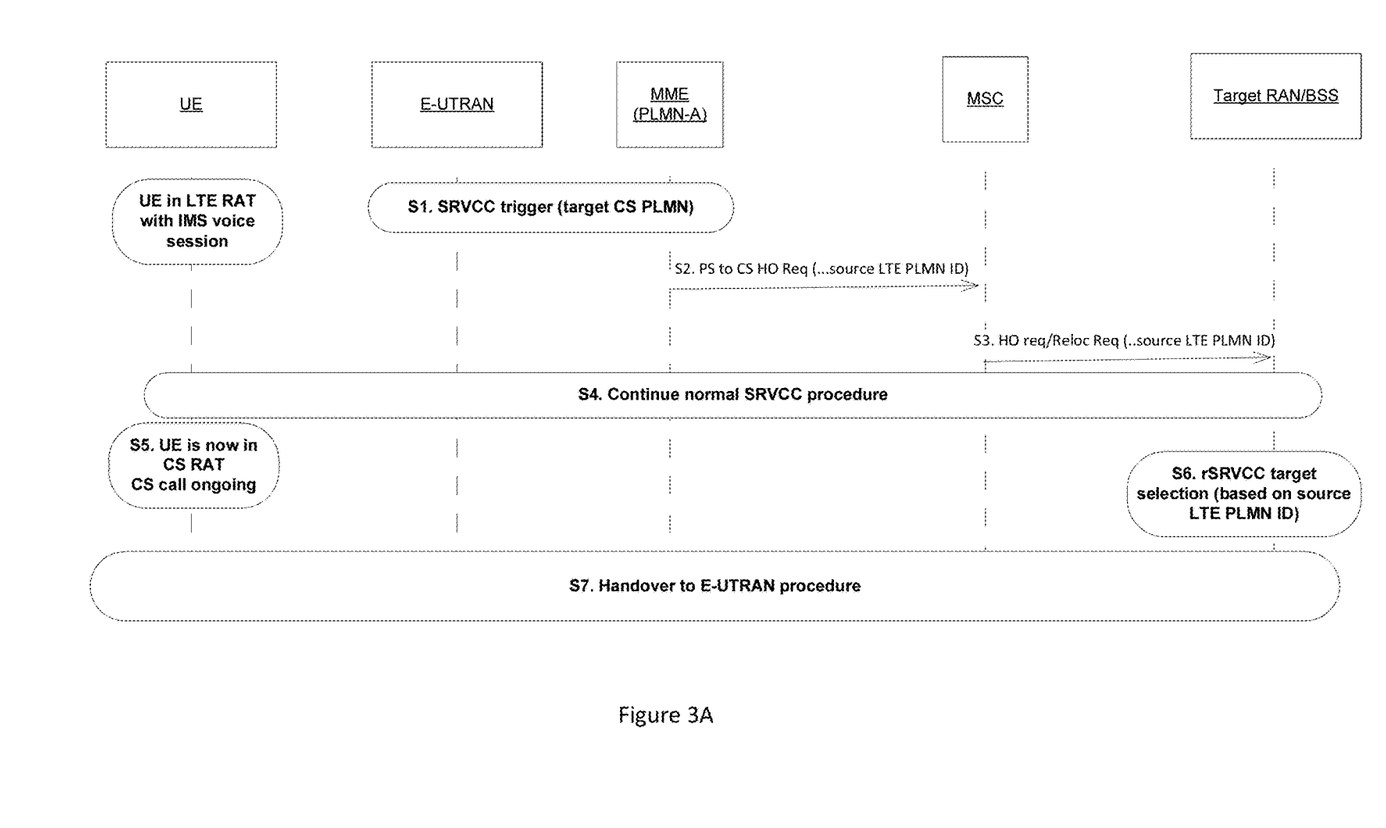
FIG. 3A illustrates a signaling flow according to certain embodiments.

Certain embodiments provide a way by which the radio node, such as for example a BTS or NodeB, can decide which PLMN (A or B) to use for target LTE selection. FIG. 3A illustrates a signaling flow according to certain embodiments.

As shown in FIG. 3A, when the call may be first SRVCC from LTE to CS at B1, the source LTE PLMN-ID may be carried to MSS via Sv interface in PS to CS handover request message at B2.

At B3, if the CS PLMN supports rSRVCC, the MSS may also indicate this "source LTE PLMN-ID" to target BSS/RAN. Moreover, at B4 and B5, the rest of the SRVCC procedure may be executed and the UE may be now served by CS RAT. The voice call may be continuing in CS Domain.

If there may be an inter/intra CS RATs handover, the source BSS/RAN may forward the "source LTE PLMN-ID" to the target BSS/RAN. This is not shown in FIG. 3A.

At B6, when the current serving CS RAT may need to perform rSRVCC target selection, it may use the "source LTE PLMN-ID" as one of the input for target LTE selection to ensure the selected PLMN will not result in a fail call. Thus, the current serving CS RAT may select an LTE cell that belongs to a source LTE PLMN-ID. Alternatively, the current serving CS RAT may select a roaming partner of the source LTE PLMN as a next option. The Neighbor cell list for UE measurement may be also based on the "source LTE PLMN-ID".

At B7, the source BSS/RAN may pass the selected target LTE PLMN back to the MSS to continue the normal rSRVCC procedure.

Thus, in certain embodiments the source LTE PLMN ID may be given to the CS PLMN and it may be passed within the CS PLMN from source to target during intra/inter RAT CS handover.

Another aspect of certain embodiments may be that the MSS stores the source LTE PLMN ID for a further new CS call. This stored source LTE PLMN ID may be updated at the next SRVCC procedure from the Sv interface, if received.

Although the illustration in FIG. 2 is using one CS PLMN with 2 LTE PLMNs, the same approach may be applied to a circuit switched public land mobile network shared by multiple operators.

In one case, a user equipment (UE) may start a CS call with PLMN-A and get handed over to target PLMN-CS. The source BTS/NodeB may select the "target CS PLMN" and can may comprise this selected "target CS PLMN" in a message to the PLMN-CS's MSS via normal BSS/RAN to MSS signaling, for example Iu-cs/A, for target resource handling. When this call is returned, going from PLMN-CS to PLMN-A with normal CS handover, the CS radio node, such as for example a BTS or NodeB, may select the target CS PLMN based on a current PLMN in use. This may still be the selected PLMN-A or other PLMN-x.

If a wrong PLMN-x is selected, the result may be an additional roaming leg being setup between PLMN-A and PLMN-x which may lead to unnecessary roaming charges because an additional PLMN is involved.

Figure 3B:
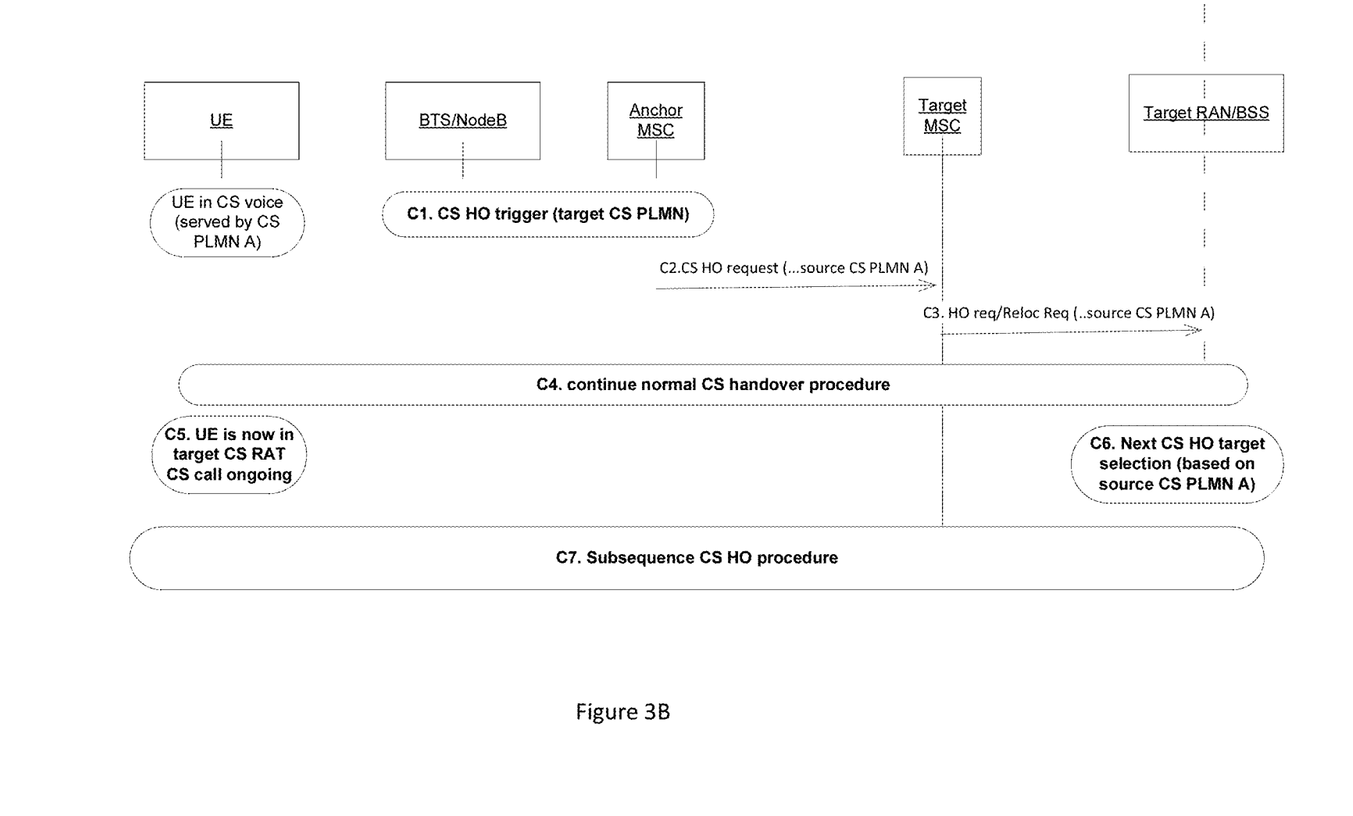
FIG. 3B illustrates a signaling flow according to certain embodiments.

FIG. 3B illustrates a signaling flow according to certain embodiments.

As shown in FIG. 3B, when the call is first performing CS handover at C1, the source CS PLMN A may be carried to MSS via normal BSS/RAN-MSS signaling.

At C2 and C3, the anchor MSS may indicate this "source CS PLMN A" to target BSS/RAN via target MSC. Moreover, at C4 and C5, the rest of the CS handover procedure may be executed and the UE may be now served by target CS RAT. The voice call may continue in the CS Domain.

If there is an inter/intra CS RATs handover, the source BSS/RAN may forward the "source CS PLMN A" to the target BSS/RAN. This is not shown in FIG. 3B.

At C6, when the current serving CS RAT may perform CS handover target selection, and may use the "source PLMN-A" as one of the inputs for target CS selection, to ensure that the selected PLMN will result in optimized manner, thereby avoiding, for example, any extra roaming leg setup. Thus, the current serving CS RAT may select a target CS cell that belongs to a source CS PLMN A. Alternatively, the current serving CS RAT may select a roaming partner of the source CS PLMN as a next option. The Neighbor cell list for UE measurement may be also based on the "source CS PLMN A".

At C7, the source BSS/RAN may pass the selected target CS PLMN back to the Anchor MSS to continue the normal CS HO procedure.

Thus, in certain embodiments the source CS PLMN ID may be given to the target CS PLMN and may be passed within the target CS PLMN from source to target during intra/inter RAT CS handover.

Figure 4:
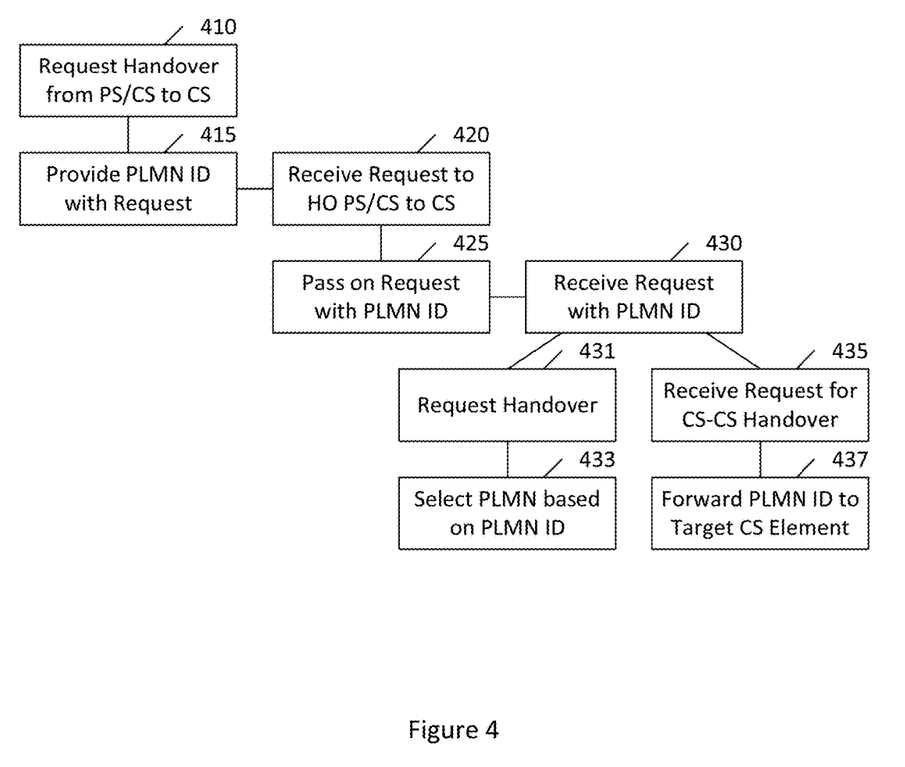
FIG. 4 illustrates a method according to certain embodiments.

FIG. 4 illustrates a method according to certain embodiments. As shown in FIG. 4, a method may comprise, at 410, requesting handover of a user equipment from a source network to a target network. The method may also comprise, at 415, providing a network identification corresponding to the source network while requesting the handover.

The source network may be a packet-switched or circuit-switched network and the target network may be a circuit switched network. The network identification may comprise an identification of a current public land mobile network in use (for example the public land mobile network used when the call or session is first established) or a source public land mobile network identifier. The handover request may be a packet switched to circuit switched or circuit switched to circuit switched handover request comprising the network identification. Moreover, the handover request may be a single radio voice call continuity request from a packet switched network to a circuit switched network. The requesting the handover may be performed for example by a mobility management entity or serving general packet radio service support node or mobile switching center and the identification may be provided for example to a mobile switching center.

Alternatively, the source network may be a circuit switched network and the target network may be a circuit switched network. Moreover, the network identification may comprise an identification of a circuit switched public land mobile network used (for example an identification of a circuit switched public land mobile network used when the call is first established or used after a packet switched to packet switched handover) or a source circuit switched public land mobile network identifier. The handover request may be a circuit switched handover request comprising the network identification. Furthermore, the handover request may be a circuit switched handover request from one circuit switched radio access technology to another circuit switched radio access technology or from one circuit switched network to another circuit switched network. Additionally, the handover may be requested by the source network and identification may be provided to the target network.

The method may also comprise, at 420, receiving a request to handover a user equipment from a source network to a target network, and, at 425, passing on that request with a network identification. Passing on the request may comprise requesting handover of a user equipment from a source network to a target network and forwarding a network identification received previously at the source network to the target network.

The source network may be a circuit switched network and the target network may be a circuit switched network. The network identification may be for example a source public land mobile network identification from a packet switched network, which might have been received with an earlier packet switched to circuit switched handover request and might be a network identification of the earlier source packet switched network or a network identifier of the earlier source packet switched network. The handover request may be an inter-radio access technologies handover request or an intra-radio access technology handover request. Moreover, the handover request may comprise the network identifier.

Alternatively, the handover request may be transmitted from a source base station controller or source radio network controller to a target base station controller or a target radio network controller. The source network may be a circuit switched network and the target network may be a circuit switched network. The network identification may be a source public land mobile network identification from a circuit switched network, which might have been received with an earlier circuit switched to circuit switched handover request and might be a network identification of the earlier source circuit switched network or a network identifier of the earlier source circuit switched network.

The method may also comprise, at 430, receiving a request for handover of the user equipment from a source network to a target network. This receiving may comprise recording a network identifier comprised with the request. The method may further comprise, at 431, requesting handover of a user equipment from a source network to a target network, for example in a reverse direction to the previously mentioned handover. The method may also comprise, at 433, determining the target network based on a network identification received previously.

The source network may be a circuit switched network and the target network may be a packet switched network. The network identification may be a source public land mobile network identification from the packet switched network (for example received from the packet switched network), or a target public land mobile network identifier. The handover request may be a circuit switched to packet switched handover request comprising the network identification. For example, the handover may be a reverse single radio voice call continuity handover. Moreover, the handover request may be transmitted from a base station controller or radio network controller to a mobile switching station. Moreover, the network identification may be one that was received with an earlier packet switched to circuit switched handover request and may be a network identification of an earlier used source packet switched public land mobile network.

Furthermore, at 435, the method may comprise receiving a request for handover of a user equipment from a source network to a target network. The method may also comprise, at 437, forwarding a network identification corresponding to the source network to the target network.

The source network may be a packet switched network and the target network may be a circuit switched network. More particularly, the network identification may be a current packet switched public land mobile network in use information or a source packet switched public land mobile network identifier. The handover request may be a packet switched to circuit switched handover request comprising the network identification. The handover request may be a reverse single radio voice call continuity handover request. Furthermore, the handover request may be received from a mobility management entity or serving general packet radio service support node and forwarded to a base station controller or radio network controller.

Figure 5A:
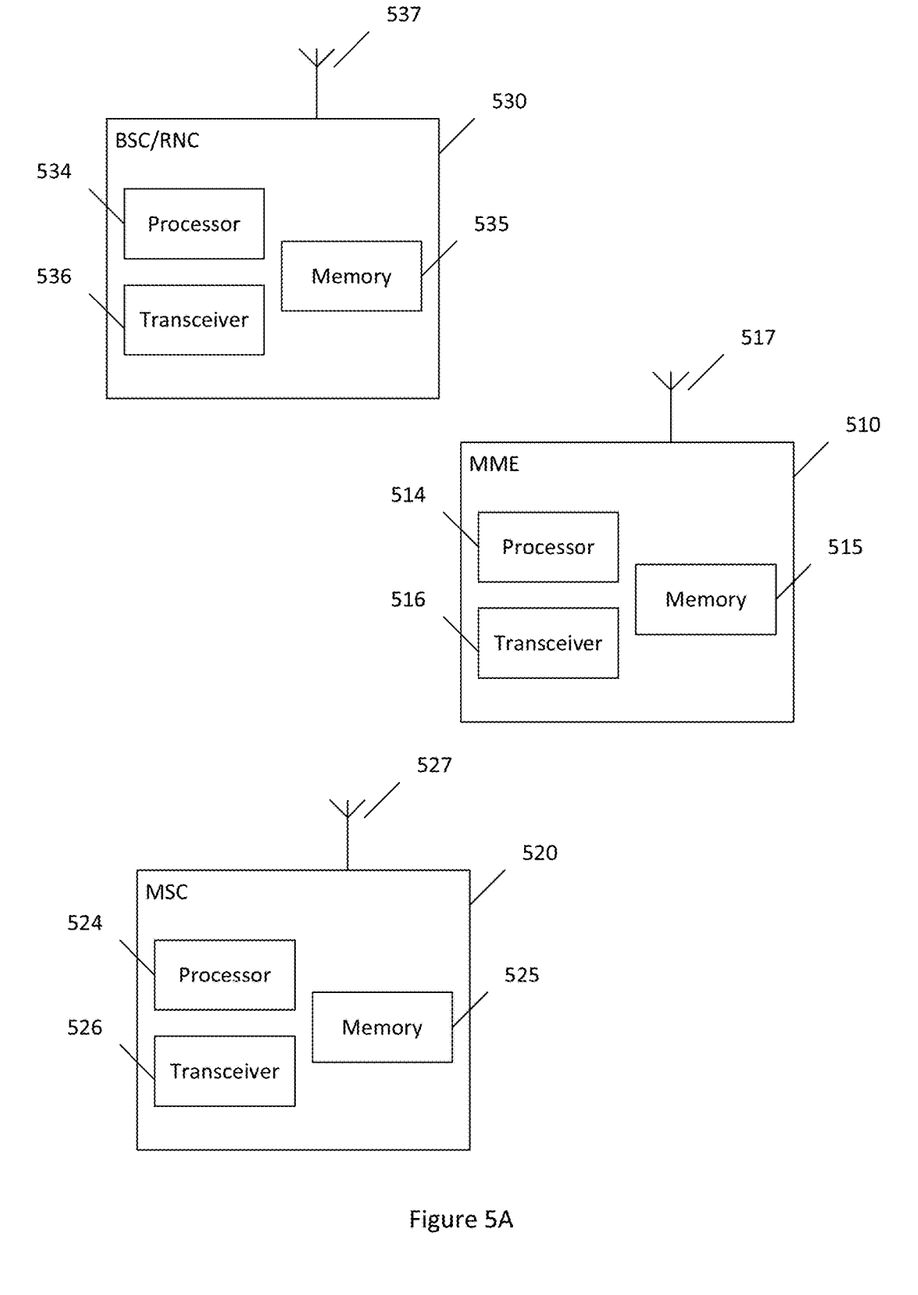
FIG. 5A illustrates a system according to certain embodiments.

FIG. 5A illustrates a system according to certain embodiments. In an example embodiment, a system may comprise of several devices, like MME 510, MSC 520, and BSC/RNC 530. These devices are merely illustrative of many other devices that can be used, such as the devices shown in FIGS. 2 and 3. Each of the devices 510, 520, and 530 may be equipped with at least one processor (respectively 514, 524, and 534), at least one memory (respectively 515, 525, and 535) (comprising computer program instructions or code), a transceiver (respectively 516, 526, and 536), and an antenna (respectively 517, 527, and 537). There is no requirement that each of these devices be so equipped. For example, it is not required that any of the devices be equipped for wireless communication, but instead may be connected by wired connections.

The transceiver (respectively 516, 526, and 536) may be a transmitter, a receiver, both a transmitter and a receiver, or a unit that is configured both for transmission and reception, and can comprise a network interface card. The transceiver (respectively 516, 526, and 536) may be coupled to corresponding one or more antenna(s) (respectively 517, 527, and 537), or other communications hardware in the case that antenna(s) are not used.

The at least one processor (respectively 514, 524, and 534) may be variously embodied by any computational or data processing device, such as a central processing unit (CPU) or application specific integrated circuit (ASIC). The at least one processor (respectively 514, 524, and 534) may be implemented as one or a plurality of controllers.

The at least one memory (respectively 515, 525, and 535) may be any suitable storage device, such as a non-transitory computer-readable medium. For example, a hard disk drive (HDD) or random access memory (RAM) may be used in the at least one memory (respectively 515, 525, and 535). The at least one memory (respectively 515, 525, and 535) may be on a same chip as the corresponding at least one processor (respectively 514, 524, and 534), or may be separate from the corresponding at least one processor (respectively 514, 524, and 534).

The computer program instructions may be any suitable form of computer program code. For example, the computer program instructions may be a compiled or interpreted computer program.

The at least one memory (respectively 515, 525, and 535) and computer program instructions may be configured to, with the at least one processor (respectively 514, 524, and 534), cause a hardware apparatus (for example, MME 510, MSC 520, or BSC/RNC 530) to perform a process, such as any of the processes described herein (see, for example, FIGS. 3 and 4).

Thus, in certain embodiments, a non-transitory computer-readable medium may be encoded with computer instructions that, when executed in hardware perform a process, such as one of the processes described herein. Alternatively, certain embodiments of the present invention may be performed entirely in hardware.

Figure 5B:
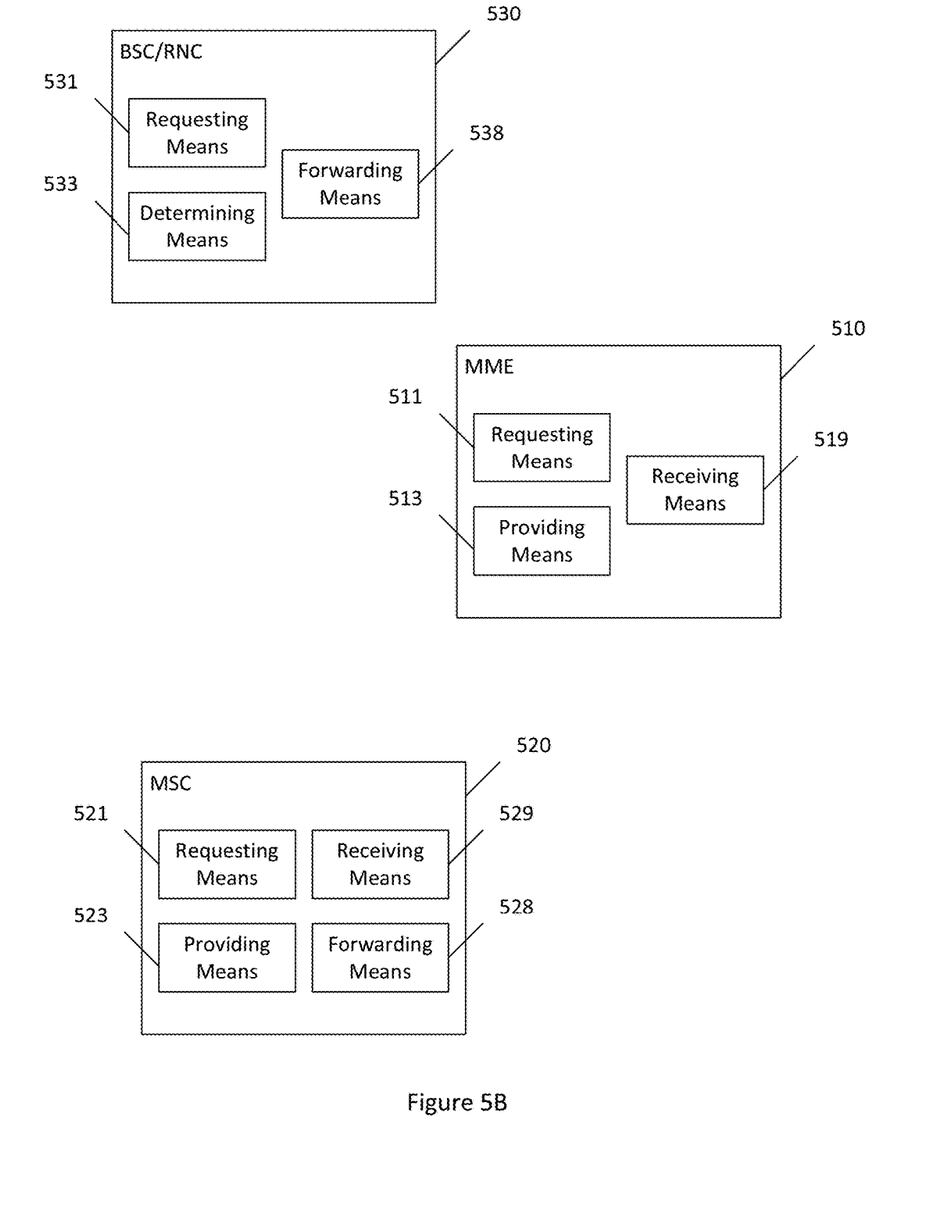
FIG. 5B illustrates a system according to certain embodiments.

FIG. 5B illustrates a system according to certain embodiments. In an example embodiment, a system may comprise several devices, for example MME 510, MSC 520, and BSC/RNC 530. These devices are merely illustrative of many other devices that can be used, such as the devices shown in FIGS. 2 and 3.

For example, the MME 510 and the MSC 520 may each comprise requesting means (respectively 511 and 521) for requesting handover of a user equipment from a source network to a target network and providing means (respectively 513 and 523) for providing a network identification corresponding to the source network while requesting the handover. The BSC/RNC may similarly comprise requesting means 531 for requesting handover of a user equipment from a source network to a target network and determining means 533 for determining the target network based on a network identification received previously.

The MSC 520 and the BSC/RNC 530 may also comprise forwarding means (respectively 528 and 538) for forwarding a network identification received previously at the source network to the target network. The MSC 520 may also comprise receiving means 529 for receiving a request for handover of a user equipment from a source network to a target network.

The means illustrated in FIG. 5B may be variously implemented, for example in hardware alone and in software running on hardware. One example of an implementation is illustrated in FIG. 5A, discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   requesting, by a network element, handover of a user equipment from a source network to a target network; and
   forwarding to the target network, by the network element, a network identification previously received at the source network, wherein the network identification comprises a public land mobile network identification (PLMN ID) identifying the source network,
   wherein the PLMN ID received at the source network is from a packet switched network, which was received with a packet switched to circuit switched handover request, and is a network identification of an earlier packet switched network or a network identifier of the earlier packet switched network,
   wherein the source network comprises a first circuit switched network and the target network comprises a second circuit switched network,
   wherein the source network selects a roaming partner of the source network to become the target network for the handover based on the PLMN ID,
   wherein the PLMN ID will result in optimized manner, thereby avoiding extra roaming leg setup, and
   a neighbor cell list for the user equipment to perform measurement is based on the PLMN ID.

2. The method of claim 1, wherein the handover request is an intra-radio access technology handover request.

3. The method of claim 1, wherein the handover request comprises the network identification.

4. The method of claim 1, wherein the handover request is transmitted from a source base station controller or source radio network controller to a target base station controller or a target radio network controller.

5. An apparatus, comprising:
   at least one processor; and
   at least one memory comprising computer program code,
   wherein at the at least one memory and the computer program code are configured to, with the at least one processor, cause the apparatus at least to
   request handover of a user equipment from a source network to a target network; and
   forward to the target network, a network identification previously received at the source network, wherein the network identification comprises a public land mobile network identification (PLMN ID) identifying the source network,
   wherein the PLMN ID received at the source network is from a packet switched network, which was received with a packet switched to circuit switched handover request, and is a network identification of an earlier packet switched network or a network identifier of the earlier packet switched network, wherein the source network comprises a first circuit switched network and the target network comprises a second circuit switched network, wherein the source network selects a roaming partner of the source network to become the target network for the handover based on the PLMN ID, wherein the PLMN ID will result in optimized manner, thereby avoiding extra roaming leg setup, and a neighbor cell list for the user equipment to perform measurement is based on the PLMN ID.

6. The apparatus of claim 5, wherein the handover request is an intra-radio access technology handover request.

7. The apparatus of claim 5, wherein the handover request comprises the network identification.

8. The apparatus of claim 5, wherein the handover request is transmitted from a source base station controller or source radio network controller to a target base station controller or a target radio network controller.

9. The apparatus of claim 5, wherein the apparatus comprises a base station controller, a radio network controller, or a mobile switching center.

\* \* \* \* \*